(12) United States Patent
Domanus

(10) Patent No.: US 10,246,026 B1
(45) Date of Patent: Apr. 2, 2019

(54) CAR TOP CARRIER AND HINGE THEREFOR

(71) Applicant: Impact Plastics Corporation, Elgin, IL (US)

(72) Inventor: Donald J. Domanus, McHenry, IL (US)

(73) Assignee: Impact Plastics Corporation, Elgin, IL (US)

( * ) Notice: Subject to any disclaimer, the term of this patent is extended or adjusted under 35 U.S.C. 154(b) by 24 days.

(21) Appl. No.: 15/465,823

(22) Filed: Mar. 22, 2017

(51) Int. Cl.
*B60R 9/048* (2006.01)
*B60R 9/055* (2006.01)

(52) U.S. Cl.
CPC ............ *B60R 9/048* (2013.01); *B60R 9/055* (2013.01)

(58) Field of Classification Search
CPC ................................. B60R 9/048; B60R 9/055
USPC ........................................................ 224/328
See application file for complete search history.

(56) References Cited

U.S. PATENT DOCUMENTS

| 2,746,081 | A | | 5/1956 | Gershen | |
|---|---|---|---|---|---|
| 2,920,802 | A | * | 1/1960 | Cook | B60R 9/055 190/19 |
| 3,233,820 | A | * | 2/1966 | Williams | E05D 5/04 220/829 |
| 4,099,647 | A | | 7/1978 | Bergh et al. | |
| 4,307,819 | A | | 12/1981 | Araki | |
| 4,378,898 | A | * | 4/1983 | Smeenge | B60R 9/055 224/315 |
| 4,406,387 | A | * | 9/1983 | Rasor | B60R 9/055 220/4.22 |
| 4,420,105 | A | | 12/1983 | Nepper | |
| 4,729,475 | A | | 3/1988 | Kurkjian | |
| 4,780,929 | A | | 11/1988 | Burns | |
| 7,503,470 | B2 | | 3/2009 | Settelmayer et al. | |
| 7,877,922 | B1 | * | 2/2011 | Petrie | A01K 97/08 206/315.11 |
| D729,605 | S | | 5/2015 | Ramey | |
| 2002/0178560 | A1 | | 12/2002 | Cardona | |
| 2004/0256427 | A1 | * | 12/2004 | Settelmayer | B60R 9/055 224/319 |
| 2005/0194414 | A1 | * | 9/2005 | Lynch | B60R 9/055 224/401 |
| 2006/0283869 | A1 | | 12/2006 | Soncini | |
| 2007/0205240 | A1 | * | 9/2007 | Castro | B60R 9/048 224/328 |
| 2008/0244864 | A1 | | 10/2008 | Yi | |
| 2011/0186608 | A1 | * | 8/2011 | Sautter | B60R 9/055 224/328 |
| 2012/0111910 | A1 | * | 5/2012 | Sautter | B60R 9/055 224/309 |
| 2012/0228349 | A1 | | 9/2012 | Sautter et al. | |
| 2012/0292358 | A1 | * | 11/2012 | Brej | B60R 9/055 224/309 |

FOREIGN PATENT DOCUMENTS

NL        1032478 C1   3/2008

\* cited by examiner

*Primary Examiner* — Derek J Battisti
(74) *Attorney, Agent, or Firm* — Mathew R. P. Perrone, Jr.; Joseph J. Whang

(57) ABSTRACT

A car top carrier with a carrier bottom and a carrier top are be connected by a hinge without the use of tools. The carrier bottom and the carrier top, which form the car top carrier, are nestable when not connected by the hinge.

2 Claims, 17 Drawing Sheets

CAR TOP CARRIER AND HINGE THEREFOR

This invention relates to a car top carrier and hinge therefor and more particularly to a car top carrier and hinge therefor, which permits assembly of the car top carrier without tools, and provides a nesting capability for the car top carrier in order to facilitate storage thereof.

BACKGROUND OF THE INVENTION

Many problems exist with a car top carrier. A car top carrier provides extra storage for a vehicle. Customarily, the carrier has two halves joined together by a hinge. With the two halves of the car top carrier having a generally concave shape, various items can be stored therein and transported, while the car top carrier is secured to the roof of the a vehicle.

Typically, there are clamps, which secure the two halves together. Such extra storage is very useful, when a vehicle is being used on a long trip. Luggage, camping gear, or any other necessary travel goods can be stored therein.

While the car top carrier is very useful, it has a number of drawbacks. It is very bulky. This feature makes it hard to store and transport. Typically, the car top carrier is too large to fit into a standard family vehicle. Thus, it is difficult to transport, unless it is mounted on the top of a vehicle.

The limited use of a car top carrier is another factor. This car top carrier must usually be stored for about 300 days every year. It is unusual for a car top carrier be used more than about 65 days a year. Thus, storage problems abound with a bulky car top carrier. A clear advantage can be obtained by improving the storage capability of a car top carrier Typically, a purchaser must assemble the car top carrier and mount it on a vehicle in order to move that purchase to a desired spot. Typically, assembling a car top carrier requires time, patience, and tools. When a car top carrier uses a hinge, installing the hinge to complete the car top carrier is a major problem. This problem must be solved in order to make use of the car top carrier. A simplified hinge is therefore a very desirable solution for car top carrier.

When use of the car top carrier is not required, the size of it makes it hard to store. It is hard to get into a house. It occupies too much room in a garage or a shed, as well as a house. If a storage problem can be solved, great advantages can be obtained.

Thus it may be seen that the great advantages are obtained if the difficulties of assembling a car top carrier, storing a car top carrier, or transporting a car top carrier can be overcome. To that end, much effort is known to be used in order to solve those problems.

SUMMARY OF THE INVENTION

Among the many objectives of the present invention is the provision of a car top carrier with a mounted hinge on one edge thereof.

Another objective of the present invention is the provision of a car top carrier, which includes a carrier top and a carrier bottom which are nestable.

Yet another objective of the present invention is the provision of a car top carrier, which is easily assembled.

Still another objective of the present invention is the provision of a car top carrier, which is easily disassembled.

Also an objective of the present invention is the provision of a car top carrier, which is easily stored.

These and other objectives of the invention (which other objectives become clear by consideration of the specification, claims and drawings as a whole) are met by providing a car top carrier with a carrier bottom and a carrier top which can be connected by a hinge without the use of tools, wherein the carrier bottom and the carrier top are nestable when not connected by the hinge.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
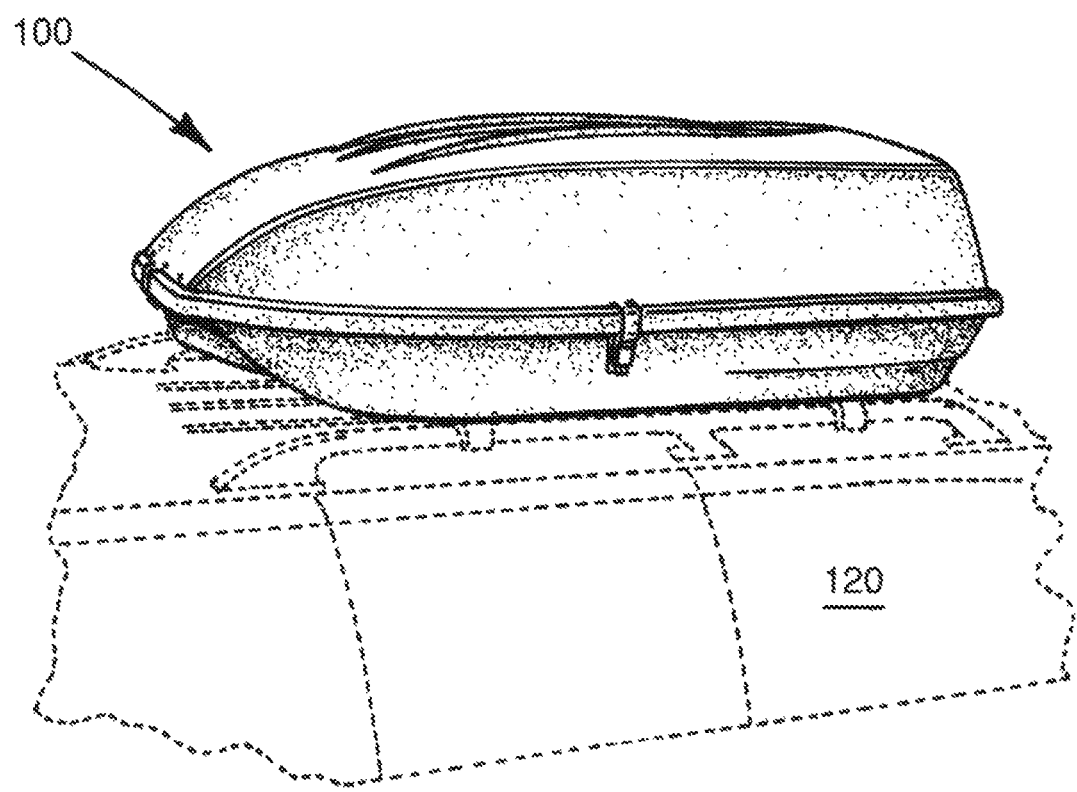
FIG. 1 depicts car top carrier 100 mounted on vehicle 120 drawn in phantom.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

The car top carrier of this invention provides ease of storage and ease of assembly. An upper storage container combines with a lower storage container by having an upper hinge member on the upper storage container mate with a lower hinge member on the lower storage container. An appropriate number of female assembly members are available on the upper hinge member or the lower hinge members to mate with the corresponding number and positioned male assembly member. Such a system permits easy joining and separation of the upper storage container and the lower storage container. With the upper storage container and the lower storage container being capable of a nesting arrangement when the lower hinge member and the upper hinge member are separated, a substantial advantage in storing the car top carrier is achieved.

Turning now to FIG. 1, FIG. 2, FIG. 3, and FIG. 15, the car top carrier 100 shows its great advantages. The carrier top 102 is releasably attached to carrier bottom 104 by hinge 106 while car top carrier 100 is mounted on the vehicle 120. With prop bar 108, cargo 110 can be loaded or unloaded or viewed relative to carrier bottom 104.

Figure 4:
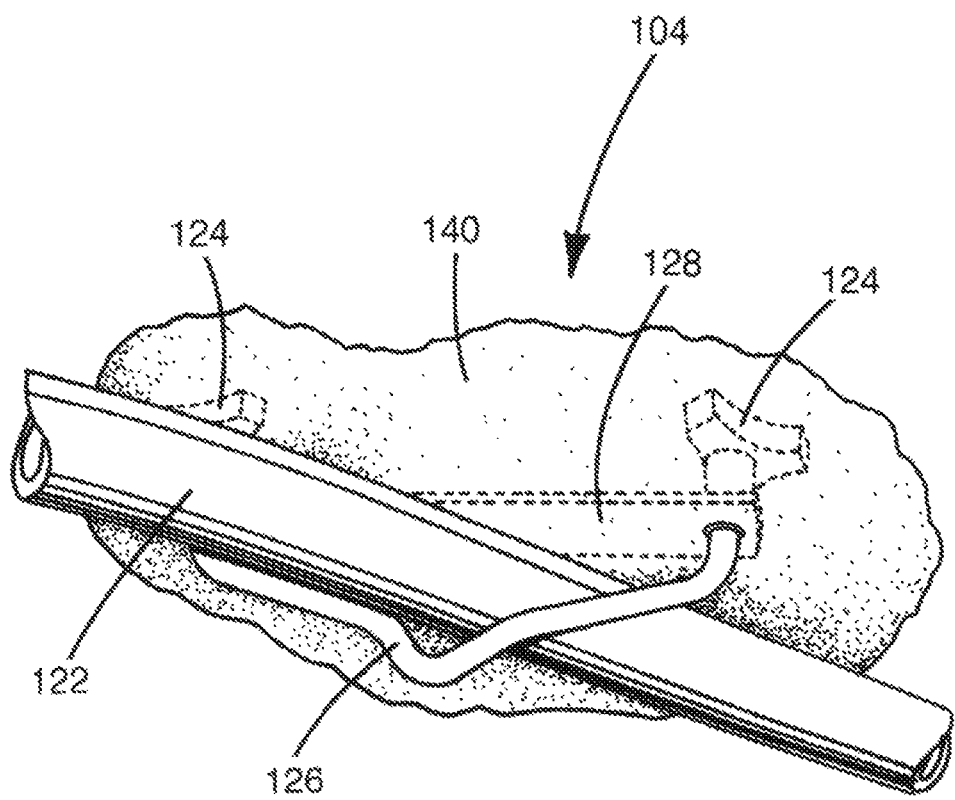
FIG. 4 depicts cargo 110 with its capacity of carrier bottom 104 for car top carrier 100 as mounted to cross rail 122 of car top carrier 100.
Figure 5:
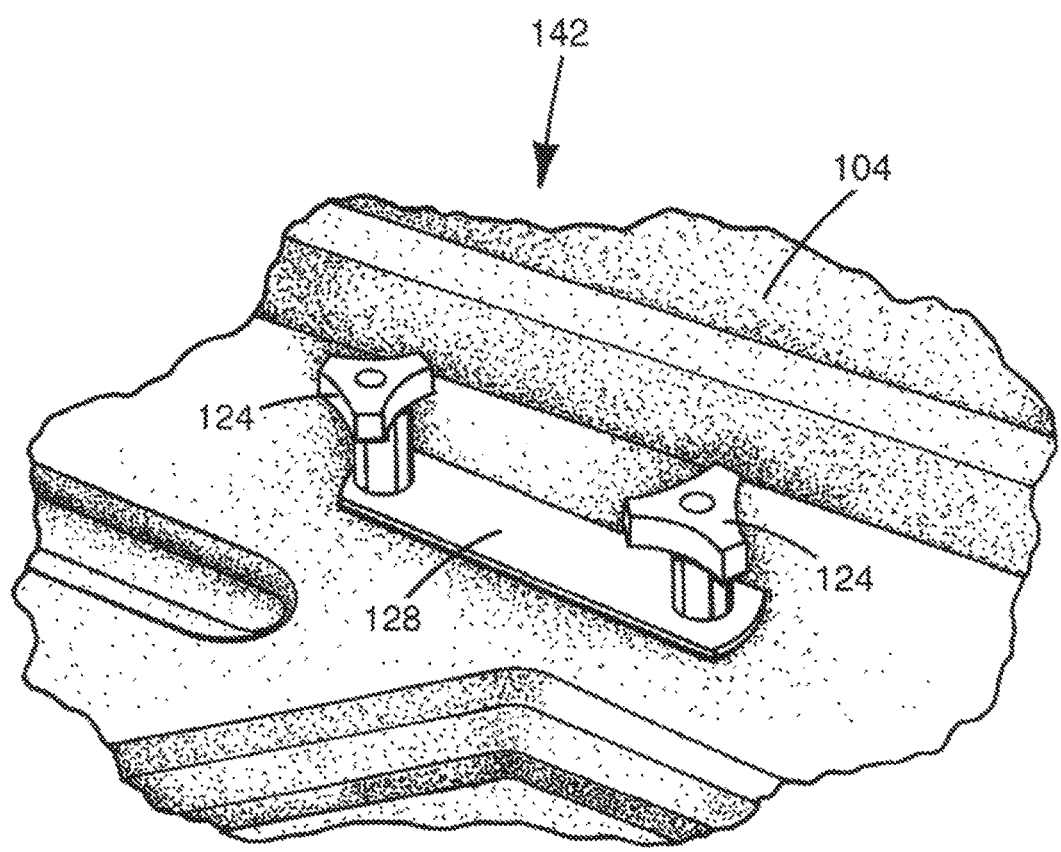
FIG. 5 depicts mounting bracket 126 of FIG. 4 from inside carrier bottom 104 using back plate 128 with two threaded knobs 124.
Figure 6:
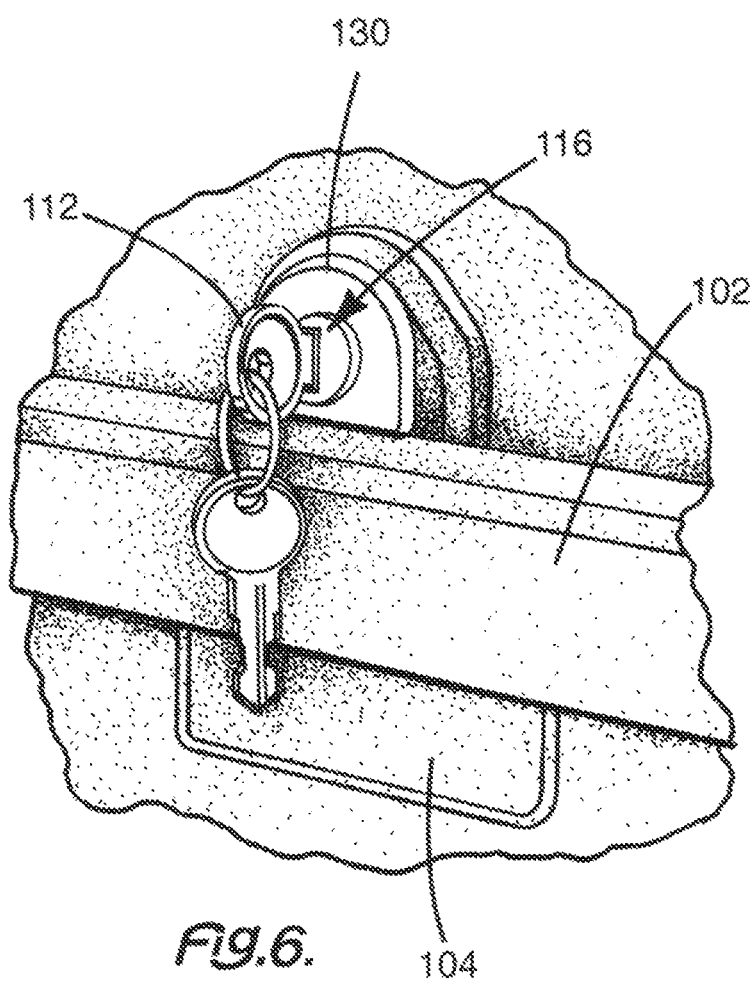
FIG. 6 depicts carrier top 102 closed to carrier bottom 104 by using lid lock 130 with key 112 in vertical open position 116.
Figure 7:
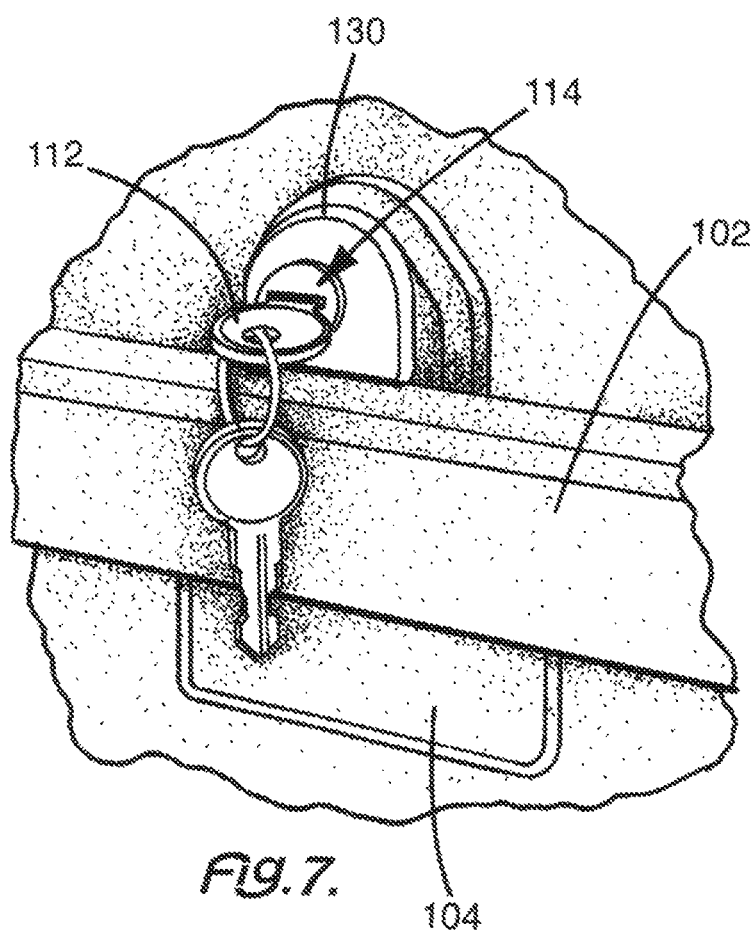
FIG. 7 depicts FIG. 6 but for with key 112 in horizontal locked position 114.
Figure 8:
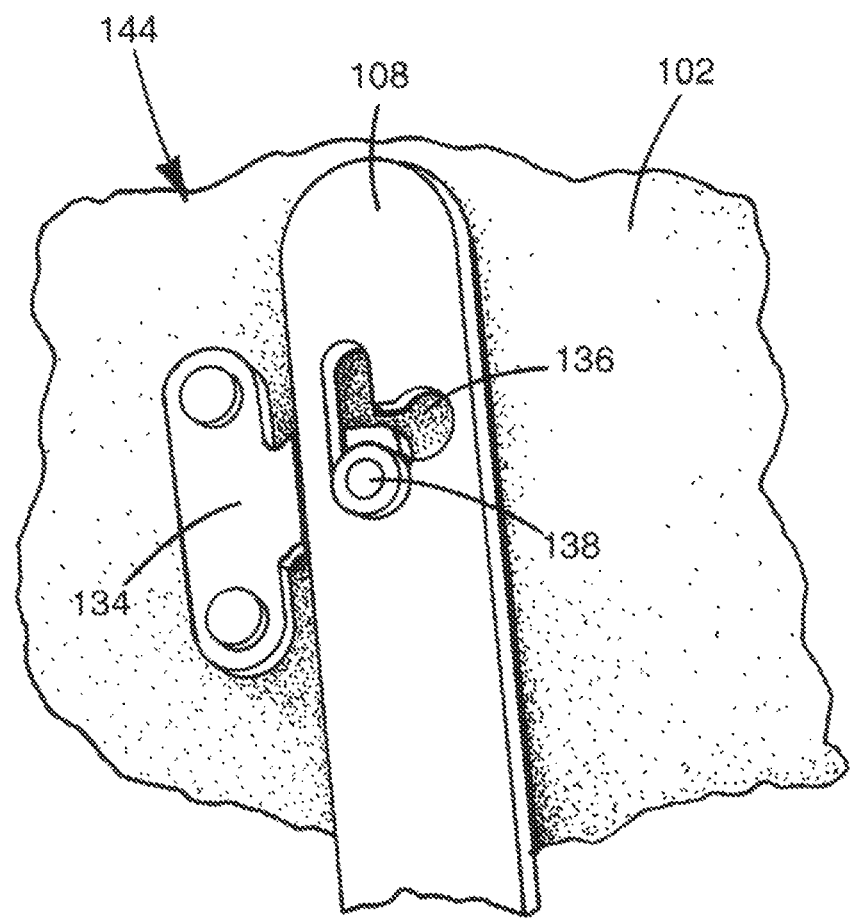
FIG. 8 depicts prop bar 108 engaged with upright bracket 134 having with retainer hub 138 holding in attachment aperture 136.

Turning now to FIG. 4 and FIG. 5, mounting bracket 126 is placed around cross rail 122 of vehicle 120 and secured to carrier bottom 104 of carrier bottom 104 by threading mounting bracket 126 through bracket apertures 166 in carrier bottom 104 and then threading further through back plate 128 and threaded knobs 124, capping mounting bracket 126 in the interior of carrier bottom 104.

Turning now to FIG. 12, FIG. 13, FIG. 14, and FIG. 15, hinge 106 becomes clearer. Carrier top is attached to carrier bottom 104 by hinge 106 by placing s tongue 172 of top hinge half 170 through a corresponding receiving slot 182 in bottom hinge half 180. Thereafter clip hook 162 is secured in safety aperture 174 to prevent an undesired separation of top hinge half 170 from bottom hinge half 180.

Turning now to FIG. 2, FIG. 8, FIG. 9, and FIG. 15, the structure of car top carrier 100 becomes even clearer. When the car top carrier 100 is in open position 190, carrier top 102 and carrier bottom 104 are supported relative to each other by prop bar 108. Prop bar 108 is secured to the interior of carrier bottom 104 and carrier top 102 with prop brackets 134 by inserting retainer hub 138 into attachment aperture 136 of prop bar 108. The bottom view 140 (FIG. 4), the top view 142 (FIG. 5) and the inside view 144 (FIG. 8) of the car top carrier make the structure.

Figure 9:
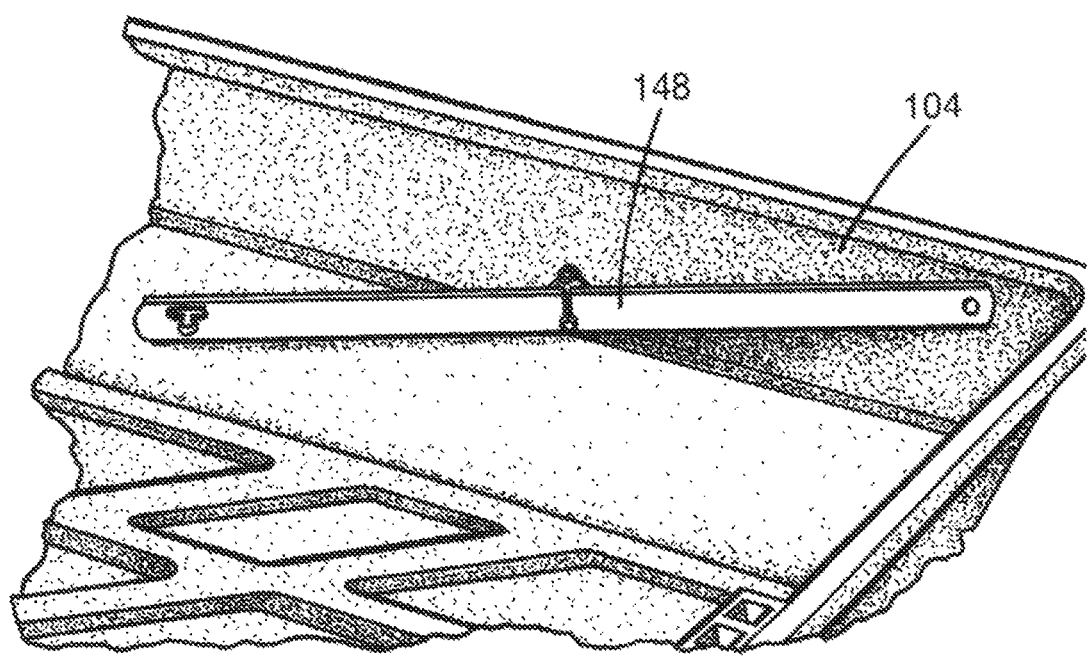
FIG. 9 depicts carrier bottom base 104 with folding spring loaded upright 148.
Figure 10:
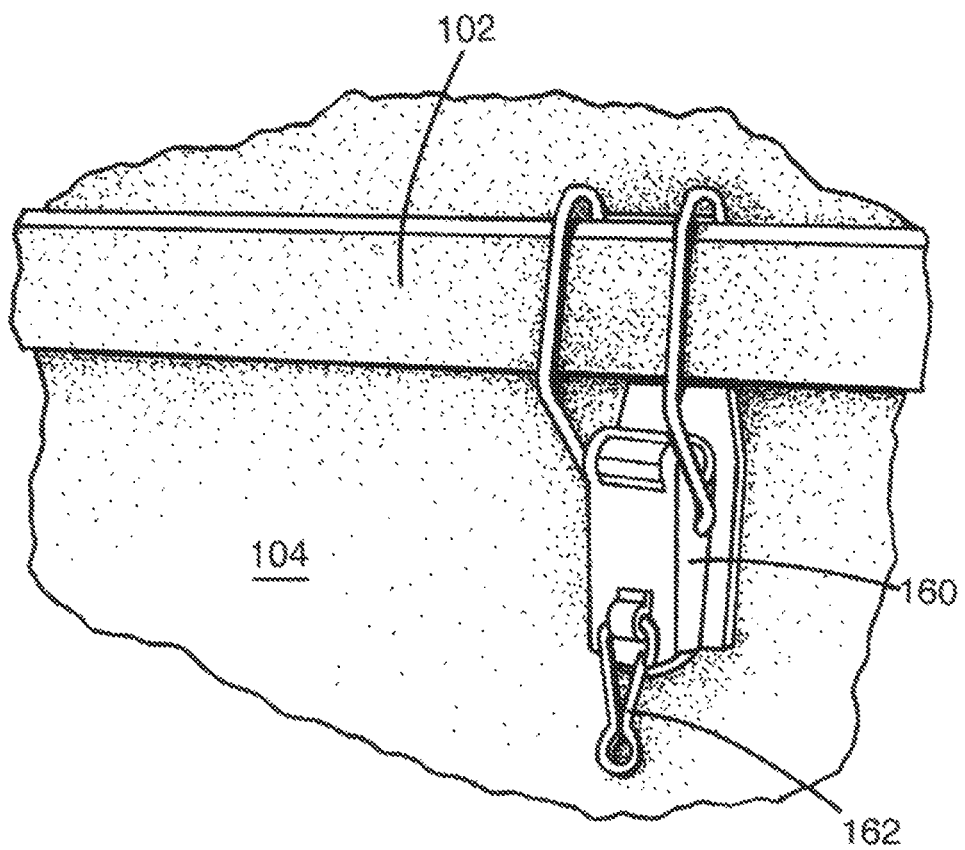
FIG. 10 depicts clip hook 162 securing bale latch 160 in holding carrier top 102 closed to carrier bottom 104.
Figure 11:
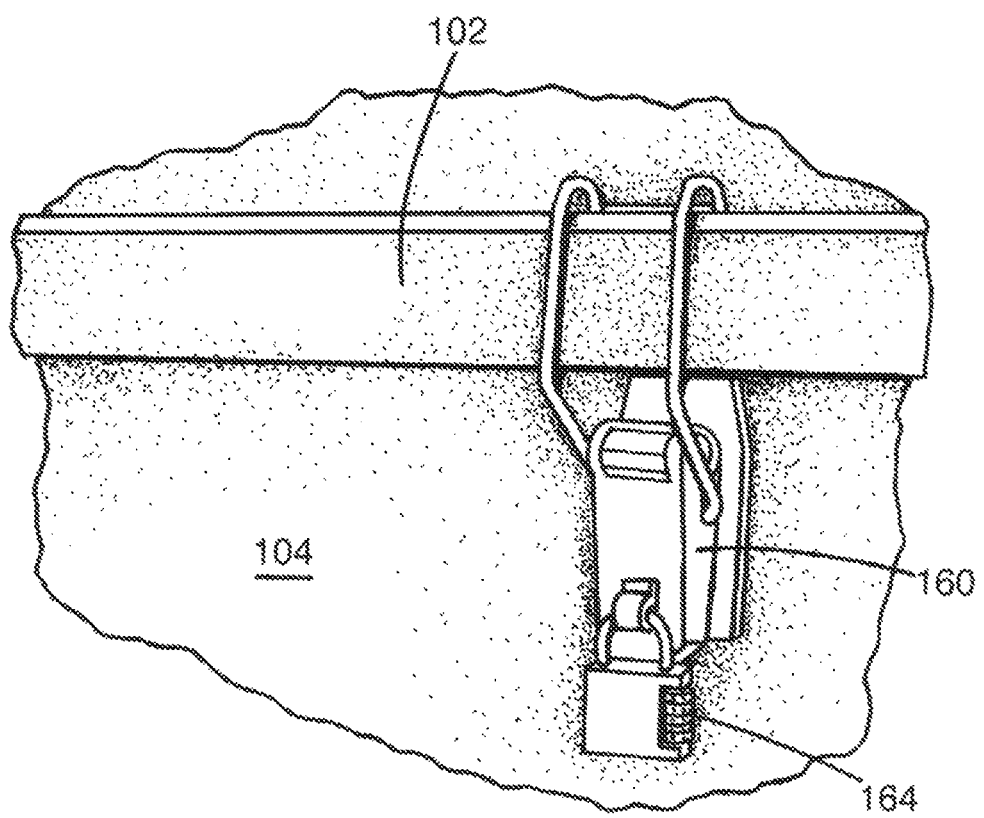
FIG. 11 depicts FIG. 10, with security lock 164.

In FIG. 9, carrier bottom 104 has folding spring loaded upright prop 148. Folding spring loaded upright prop 148 may act independently of or cooperate with prop bar 108 to hold car top carrier 100 open. That is to say carrier top 102 is separated from carrier bottom 104 with the help of hinge 106.

Turning to FIG. 6, FIG. 7, FIG. 10, FIG. 11, and FIG. 14, the closed position 192 becomes clear. When the car top carrier 100 is in closed position 192, carrier top 102 and carrier bottom 104 are further secured by lid lock 130 on one lateral side of the car top carrier 100 and a bale latch 160 at the other lateral side of the car top carrier 100. The bale latch 160 is attached to carrier bottom 104 and secures it to carrier top 102. The lid lock 130 is attached to carrier top 102 and secures it to the carrier bottom 104 by inserting key 112 to the lid lock 130 and rotating key 112 from the vertical open position 116 to the horizontal locked position 114.

Figure 12:
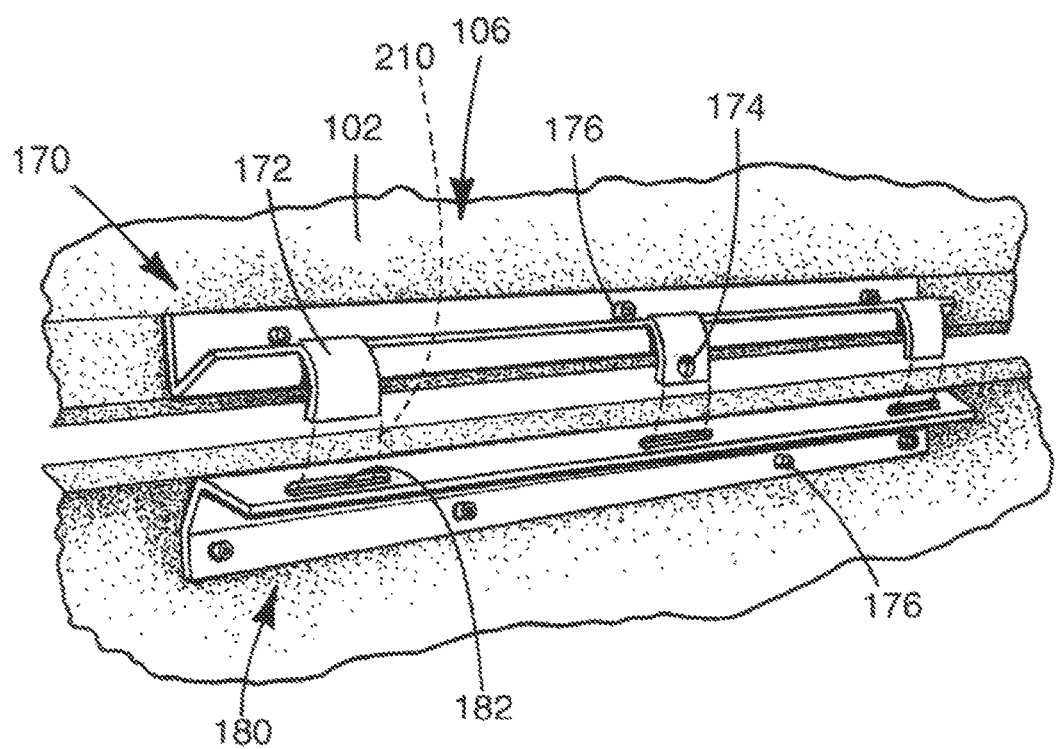
FIG. 12 depicts hinge 106 engaging the top hinge half 170 to the bottom hinge half 180 by placing tongues 172 of top hinge half 170 into receiving slots 182 of bottom hinge half 180.
Figure 13:
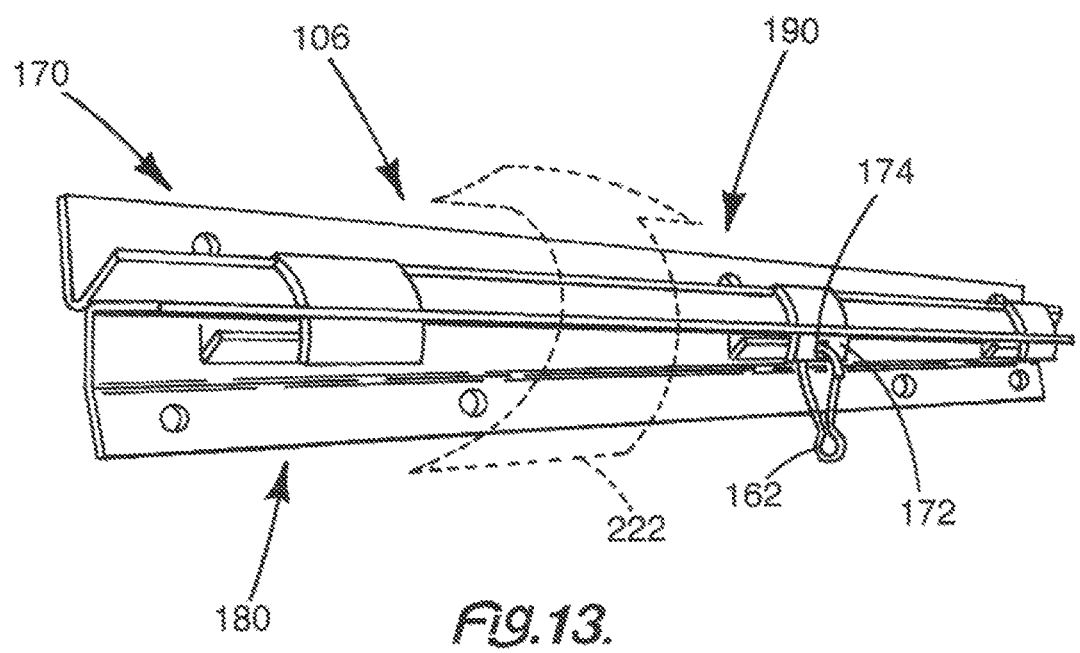
FIG. 13 depicts hinge 106 with the placement of clip hook 162 into safety aperture 174 of center tongue 172, in order to prevent hinge 106 from separating.
Figure 14:
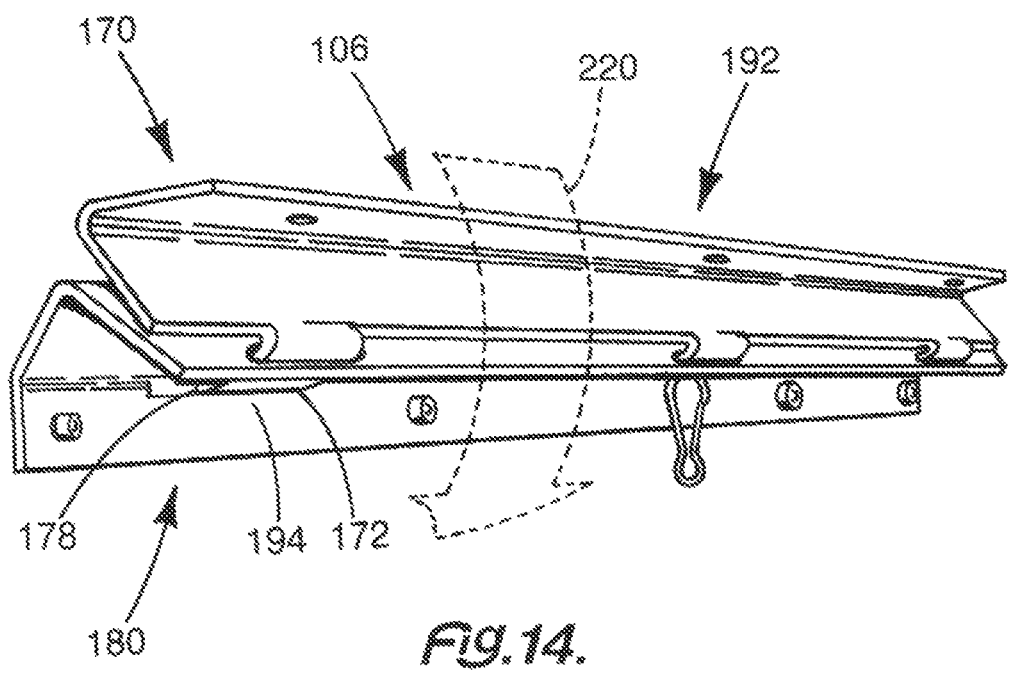
FIG. 14 depicts hinge 106 having tongue 172 with its tip 178 stopped at its closed position.
Figure 15:
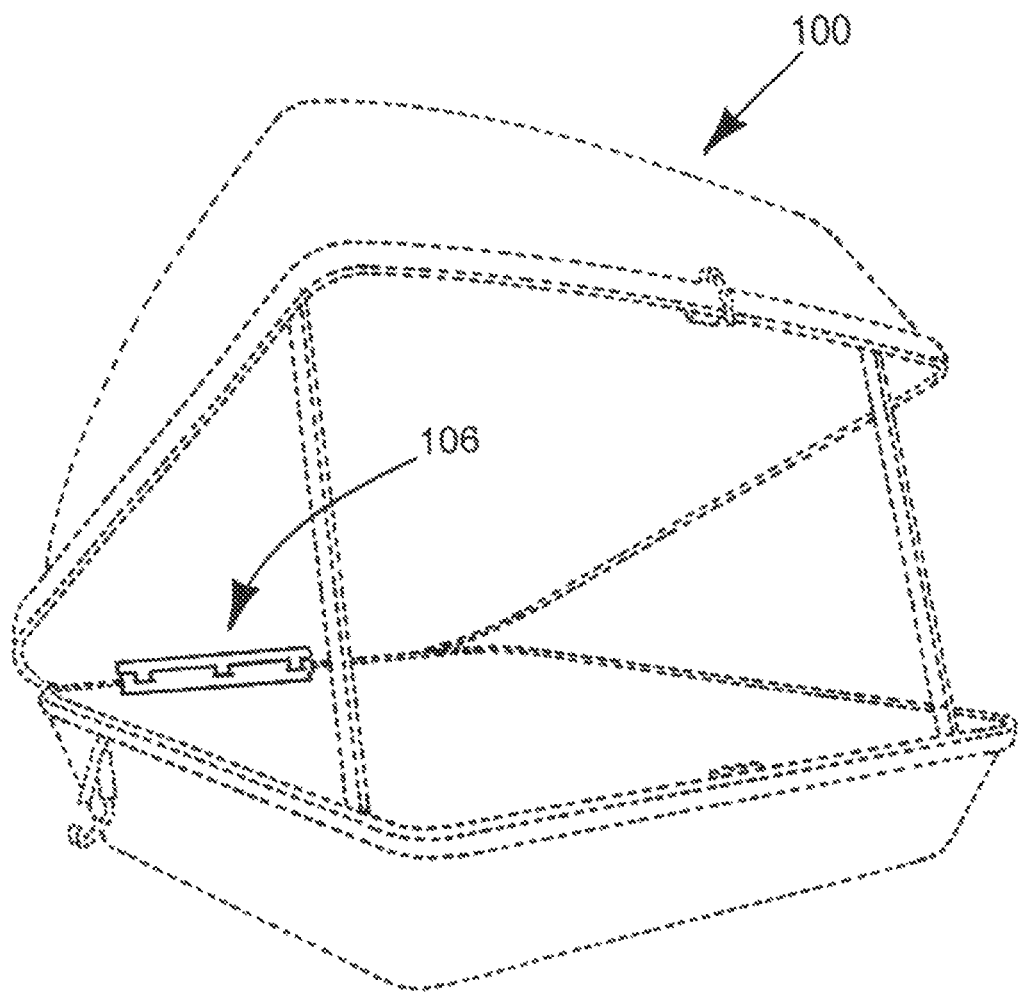
FIG. 15 depicts hinge 106 with car top carrier 100 drawn in phantom in order to how hinge 106 with clip hook 162 in place allows ease of opening and closing of car top carrier 100 for easy access.

Safety aperture 174 in FIG. 12, FIG. 13 and FIG. 14 depicts safety aperture 174 of hinge 106. In FIG. 12, hinge 106 joins the top hinge half 170 to the bottom hinge half 180 by placing tongues 172 of top hinge half 170 into receiving slots 182 of bottom hinge half 180. In FIG. 13, hinge 106 with the placement of clip hook 162 into safety aperture 174 of center tongue 172 prevents hinge 106 from separating. In FIG. 14, hinge 106 has tongue 172 with its tip 178 stopped at its closed position.

Also in FIG. 12, FIG. 13 and FIG. 14; carrier top 102 and carrier bottom 104 use hinge 106 to be joined together. Hinge 106 includes top hinge half 170 and bottom hinge half 180. Top hinge half 170 includes three of tongue 172. Bottom hinge half 180 includes three of receiving slots 182. Each tongue 172 fits into a corresponding receiving slot 182 in a male to female relationship.

Within at least one of tongue 172 is a safety aperture 174. After tongue 172 is inserted into a corresponding receiving slot 182, clip hook 162 may be inserted through safety aperture 174, in order prevent an undesired removal of tongue 172 from receiving slot 182. A desired removal requires a removal of clip hook 162 from safety aperture 174.

Insertion direction 200 (FIG. 12) for tongue tip 178 of tongue 172 permits assembly of hinge 106 along with car top carrier 100. Close direction 222 for hinge 106 (FIG. 13) also closes car top carrier 100, while open direction 220 (FIG. 14) for hinge 106 also opens car top carrier 100.

Figure 16:
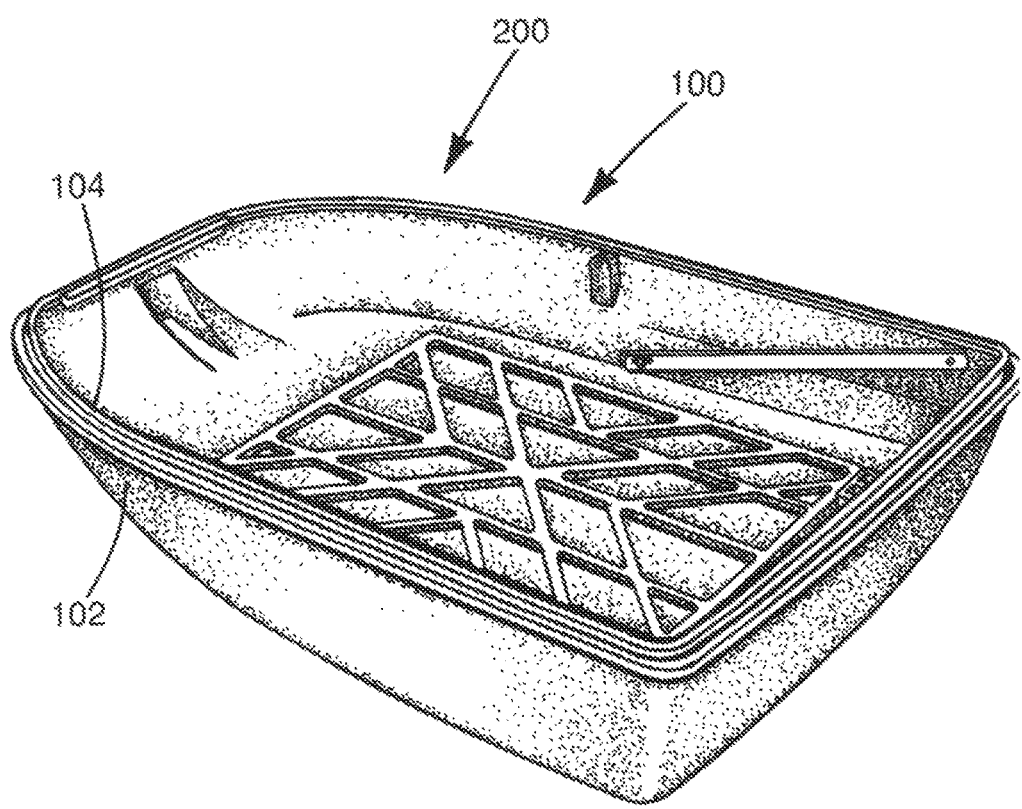
FIG. 16 depicts carrier bottom 104 neatly placed inside carrier top 102 for easy storage.

FIG. 16 depicts the nestable and preferred storage set up for car top carrier 100. Hinge 106 is separated, thereby separating carrier bottom 104 from carrier top 102. Then, carrier bottom 104 is rotated 180 degrees in order to be neatly placed inside carrier top 102 for easy storage of car top carrier 100. Alternatively, carrier top 102 may be neatly placed inside carrier bottom 104 for easy storage of car top carrier 100.

Figure 2:
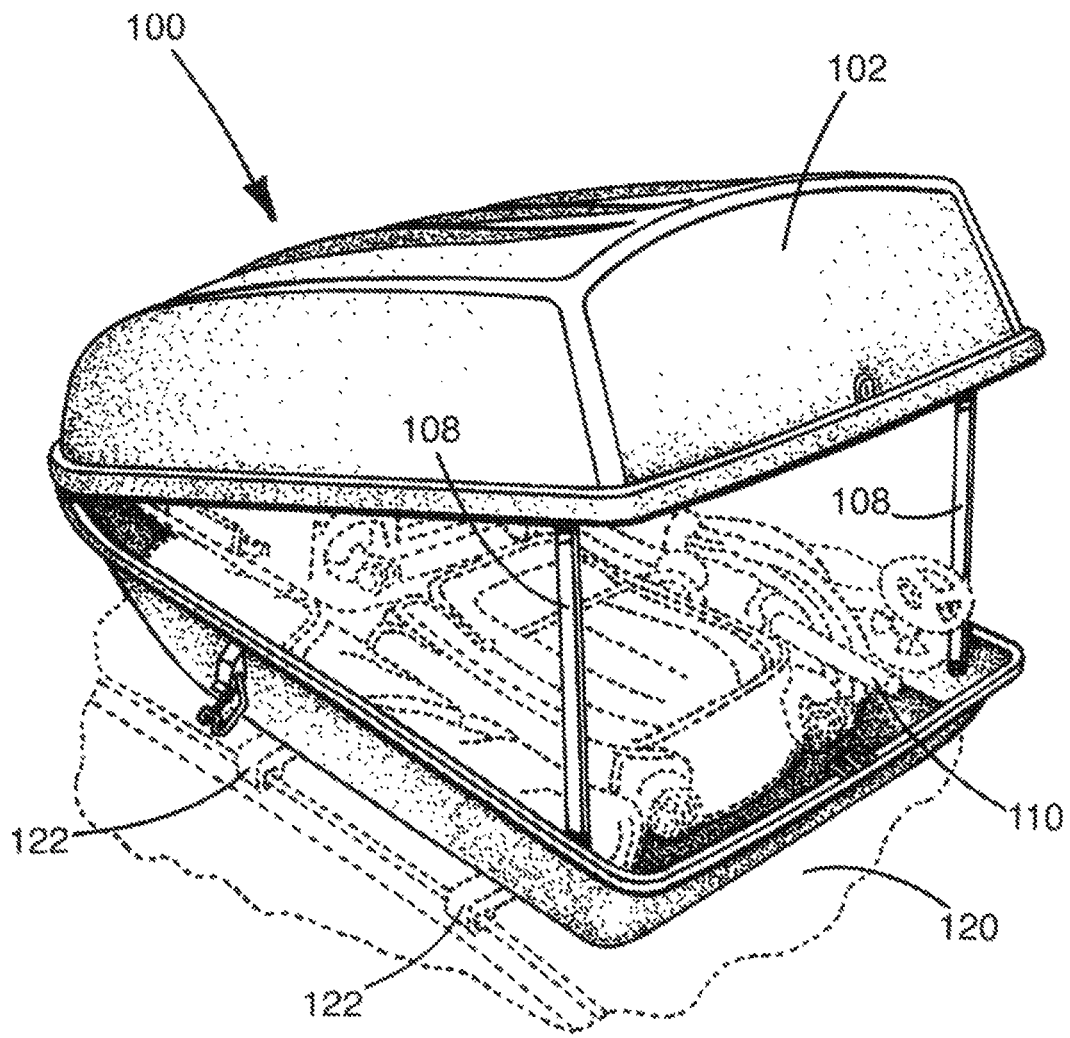
FIG. 2 depicts car top carrier 100 open to show cargo 110 contained therein with carrier top 102 raised and supported by prop bar 108.
Figure 3:
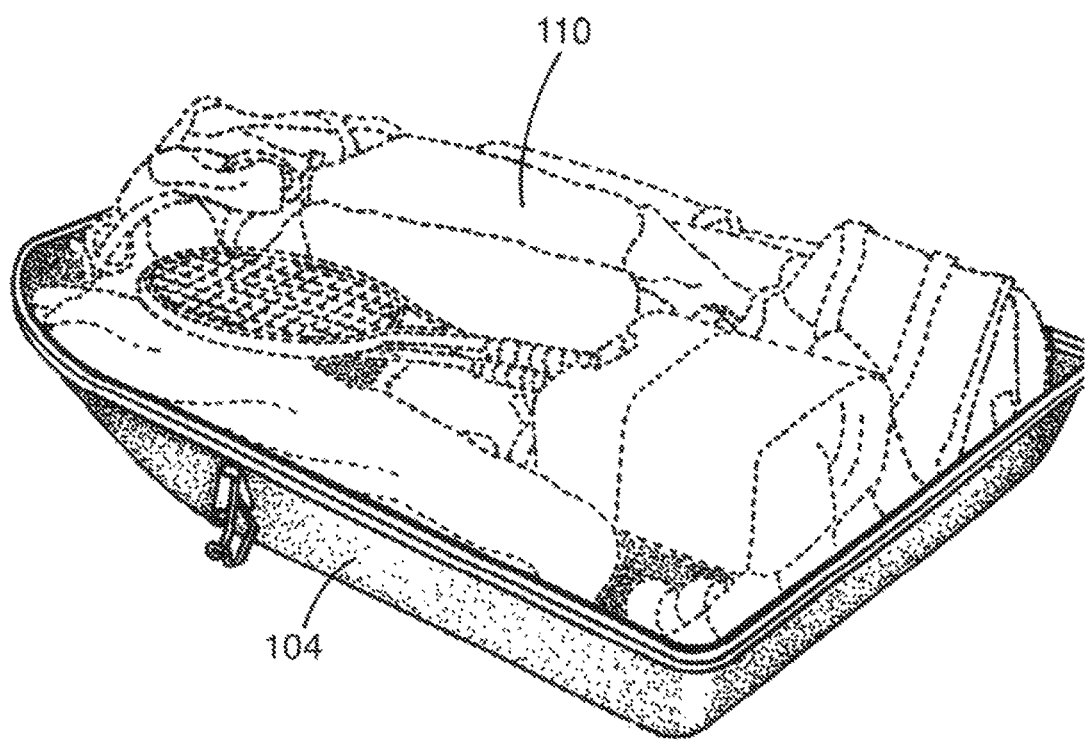
FIG. 3 depicts cargo 110 with its capacity of carrier bottom 104 for car top carrier 100.
Figure 17:
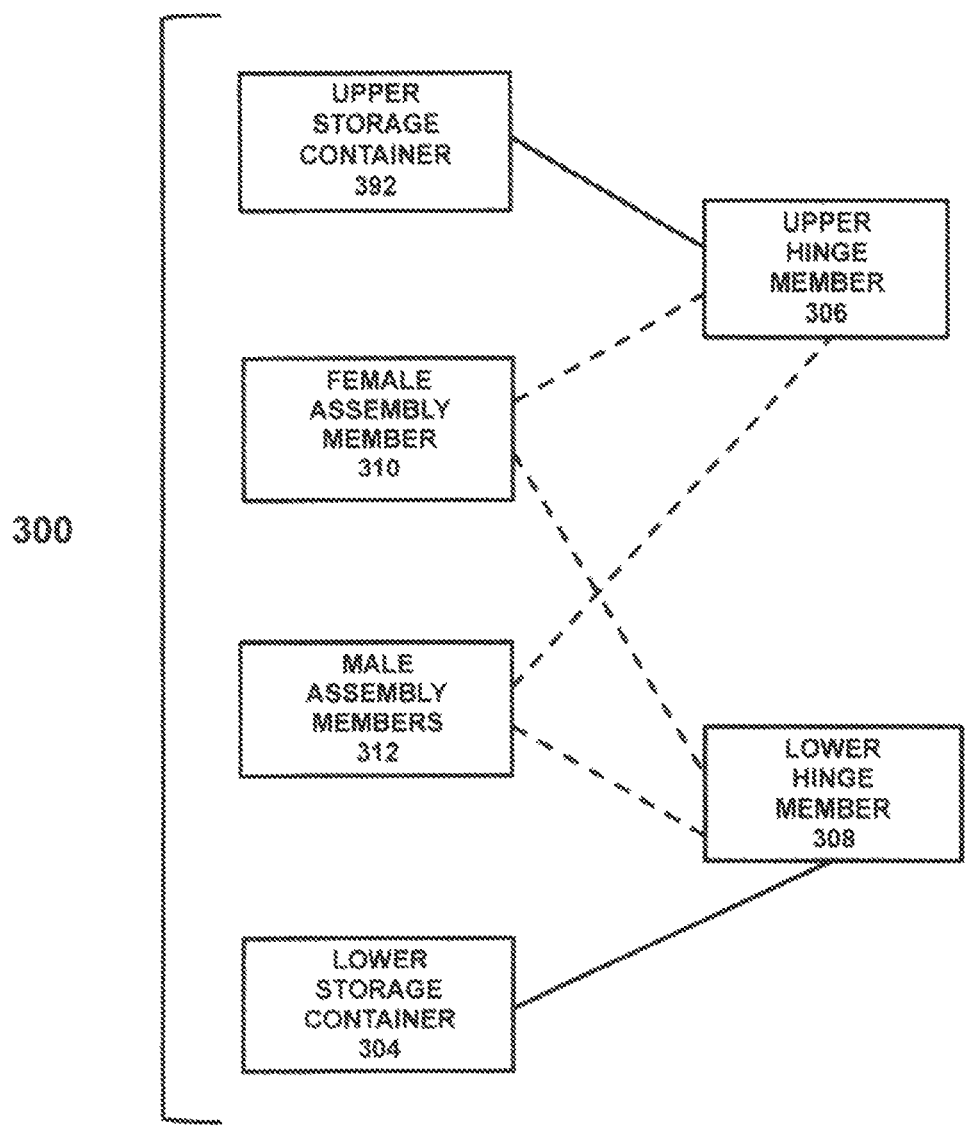
FIG. 17 depicts nestable vehicle top carrier 300 having an upper storage container 302 and a lower storage container 304, with the mounting of an upper hinge member 306 on upper storage container 302, which mates with a lower hinge member 308 on lower storage container 304.

With FIG. 17, variations on car top carrier 100 of FIG. 1 become clear. The nestable vehicle top carrier 300 has an upper storage container 302 and a lower storage container 304. With the mounting of an upper hinge member 306 on upper storage container 302, which mates with a lower hinge member 308 mounted on lower storage container 304, nestable vehicle top carrier 300 becomes feasible. Upper storage container 302 through upper hinge member 306 is joinable to lower storage container 304 through lower hinge member 308. Hinge 106 of FIG. 2 is an example of upper hinge member 306 and lower hinge member 308 working together.

Upper hinge member 306 is joinable to lower hinge member 308 with at least one female assembly member 310 and at least one male assembly member 312. The female assembly member 310 may have any suitable shape as long as there is a corresponding male assembly member 312 to be received therein. For example, the female assembly member 310 may be a slot, a circular aperture, an oval aperture, a rectangular aperture, or the like. By the same system, the male member assembly 312 must be appropriately shaped, with the slot the receiving a flat member, the circular aperture receiving a member with a circular cross-section, the oval aperture receiving a member with an oval cross-section, the rectangular aperture receiving a member with a rectangular cross-section or another appropriate shape.

The upper hinge member 306 may have any number of female assembly members 310 or male assembly members 312 so long as the lower hinge member 308 has the appropriate counterpart. There must be at least one female assembly member 310 and one male assembly member 312 in opposing positions, when it is desired to join upper storage container 302 to lower storage container 304.

Preferably there are up to 10 pairs of female assembly members 310 and male assembly members 312. More preferably there are one to eight pairs of female assembly members 310 and male assembly members 312. Most preferably there are two to five pairs of female assembly members 310 and male assembly members 312.

Also the nestable vehicle top carrier 300 can be a variety of sizes. As the size of the nestable vehicle top carrier 300 increases, the length of both upper hinge member 306 and lower hinge member 308 has a corresponding increase. Preferably there is at least one pair of female assembly member 310 and male assembly member 312 for each 100 centimeters length of the upper hinge member 306 and lower hinge member 308. More preferably there are one to eight pairs of female assembly members 310 and male assembly members 312 for each 100 centimeters length of the upper hinge member 306 and lower hinge member 308. Most preferably there two to five pairs of female assembly members 310 and male assembly members 312 for each 100 centimeters length of the upper hinge member 306 and lower hinge member 308.

Preferably the upper hinge member 306 and the lower hinge member 308 have the same length. However, as long as the female assembly members 310 and male assembly members 312 pair up, upper hinge member 306 and the lower hinge member 308 may be of different lengths.

Preferably the female assembly members 310 are on the lower hinge member 308, while the male assembly members 312 are on the upper hinge member 306. Another embodiment of this hinge structure is shown in FIG. 12. Each female assembly member 310 can mate with or join with a corresponding male assembly member 312 to form the vehicle top carrier 300 without the use of a tool.

The upper hinge member 306 may have a mixture of female assembly members 310 and male assembly members 312, as can the lower hinge member 308, so long as the appropriate counterparts are available. It is also possible for upper hinge member 306 and lower hinge member 308 have all one kind of assembly members 310 or 312. Most preferably, lower hinge member 308 has all female assembly members 310.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A vehicle top carrier comprising:
an upper storage container and a lower storage container combining to form the vehicle top carrier;
a lower hinge member being mounted on the lower storage container;
an upper hinge member being mounted on the upper storage container;
the upper hinge member joining with the lower hinge member to unite the lower storage container with the upper storage container in order to form the vehicle top carrier;
the upper hinge member being separable from the lower hinge member to provide storage for the vehicle top carrier;
the lower hinge member having at least one female assembly member or at least one male assembly member;
the upper hinge member having the at least one female assembly member or the at least one male assembly member;
the at least one female assembly member receiving the at least one male assembly member to form the vehicle top carrier;
the lower hinge member and the upper hinge member having the at least one female assembly member or the at least one male assembly member for each 100 centimeters length of a side of the upper storage container and an adjoining side of the lower storage container;
the at least one female assembly member and the at least one male assembly member being two to five pairs of female assembly members and male assembly members for each 100 centimeters in length of the upper hinge member and the lower hinge member;
the female assembly members having slot apertures, circular apertures, oval apertures, or rectangular apertures; and
the male assembly members corresponding to and fitting into the slot apertures, the circular apertures, the oval apertures, or the rectangular apertures;
the vehicle top carrier being a car top carrier;
the car top carrier providing ease of storage and ease of assembly;
the female assembly members and the male assembly members permitting easy joining and separation of the upper storage container and the lower storage container;
the upper storage container and the lower storage container being capable of a nesting arrangement when the lower hinge member and the upper hinge member are separated;
the upper storage container being a carrier top for the car top carrier;
the lower storage container being a carrier bottom for the car top carrier;
the female assembly members being mounted on the lower storage container;
the car top carrier including a prop for supporting the carrier top away from the carrier bottom in cooperation with a hinge formed by a joining of the lower hinge member and the upper hinge member;
the car top carrier being mountable a vehicle;
a mounting bracket being placed around a cross rail;
the cross rail being mounted on the vehicle;
a mounting bracket passing through bracket apertures in carrier bottom and then further through a back plate and into threaded knobs, thereby securing the car top carrier to the vehicle;
the carrier top being attached to carrier bottom by the hinge;

the hinge having a top hinge half secured to the carrier top and a bottom hinge half secured to the carrier bottom;
the top hinge half including at least one tongue;
the bottom hinge half including at least one receiving slot;
the at least one tongue fitting into the at least one receiving slot in male to female relationship;
at least one tongue of the at least one tongue including a safety aperture;
the safety aperture receiving a clip hook to prevent the tongue from leaving the receiving slot while the car top carrier is in use;
the clip hook being secured in the safety aperture in order to prevent an undesired separation of the top hinge half from the bottom hinge half;
a prop bar being mounted in the carrier bottom;
the prop bar being stored in carrier bottom as desired;
the prop bar cooperating with the hinge to raise the carrier top as desired;
the car top carrier including a lid lock to hold the car top carrier in a closed position;
the carrier top and the carrier bottom being are further secured by a bale latch;
the top hinge half joining to the bottom hinge half to form the hinge by placing a tongue of the top hinge half into a corresponding receiving slot of the bottom hinge half;
the tongue being stopped when the hinge is in a closed position;
the bottom hinge half being three in number and providing three of the receiving slots;
each of the three receiving slots accepting the tongue on the top hinge half;
the tongue fitting into the receiving slot in a male to female relationship;
a clip hook being inserted through the safety aperture in the tongue in order to prevent an undesired removal of the tongue from the receiving slot; and
a desired removal of the tongue from the receiving slot requiring a removal of the clip hook from the safety aperture.

2. The vehicle top carrier of claim 1 further comprising the carrier bottom and the carrier top being nestable for storage.

* * * * *